United States Patent [19]
Graske

[11] Patent Number: 4,982,917
[45] Date of Patent: Jan. 8, 1991

[54] GLIDER-CANOPY

[76] Inventor: Wilhelm Graske, Tilsiter Weg 3, D-4044 Kaarst, Fed. Rep. of Germany

[21] Appl. No.: 302,967

[22] Filed: Jan. 30, 1989

[30] Foreign Application Priority Data

Jan. 28, 1988 [DE] Fed. Rep. of Germany ... 8800987[U]

[51] Int. Cl.$^5$ ............................................. B64D 17/02
[52] U.S. Cl. ...................................... 244/145; 244/152
[58] Field of Search ......................... 244/142, 145, 146

[56] References Cited

U.S. PATENT DOCUMENTS

| | | | |
|---|---|---|---|
| 3,412,963 | 11/1968 | Struble, Jr. | 244/146 |
| 3,428,277 | 2/1969 | Everett, Jr. | 244/146 |
| 3,524,613 | 8/1970 | Reuter et al. | 244/142 |
| 3,525,491 | 8/1970 | Barish | 244/142 |
| 3,749,337 | 7/1973 | Jalber | 244/145 |
| 4,363,458 | 12/1982 | Jones et al. | 244/145 |
| 4,781,343 | 11/1988 | Brown | 244/145 |

FOREIGN PATENT DOCUMENTS 497448 12/1938 United Kingdom ............... 244/142

*Primary Examiner*—Galen Barefoot
*Attorney, Agent, or Firm*—Shlesinger & Myers

[57] ABSTRACT

A glider-canopy has a wing-shaped sail with a rear edge. Fins are mounted to the underside of the sail in an essentially parallel direction to the intended direction of flight. Shroud lines act on at least the fins and converge by their free ends into a personnel support. The fins are equipped with elastically bendable reinforcements tensioning the fins at least under traction from the shroud lines during flight. The fins are tensioned essentially in the horizontal direction so that in the loaded state the sail bulges downwardly at least at the rear edge, and in the event of a load decrease the reinforcements are stress relieved and the sail bulges upwardly at least at the rear edge.

24 Claims, 3 Drawing Sheets

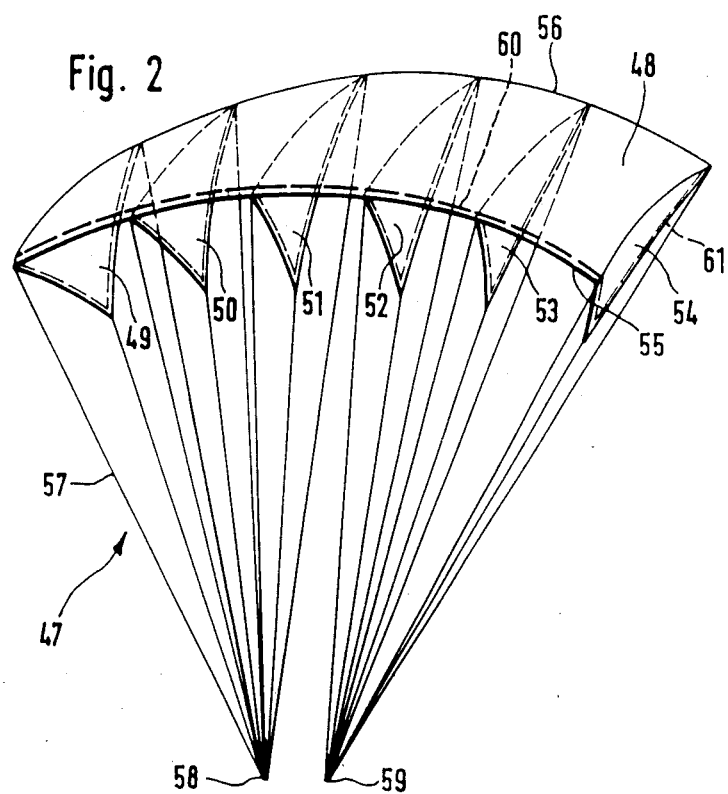
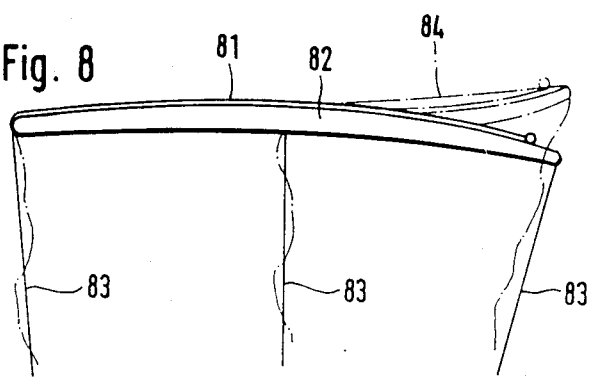

GLIDER-CANOPY

The invention concerns a glider-canopy with a wing-like sail comprising at its underside and essentially in the anticipated direction of flight, downward-extending fins, with shroud lines engaging at least the fins, the free ends of these lines converging toward a support for one person.

Such glider-canopies are similar to parachutes, however they serve for controlled flights from mountains. They include a square sail of which the underside is acted on by a plurality of shroud lines converging to a support for one person. Additionally, control ropes acting on the rear sail edge are provided, which can be actuated by the pilot and whereby sail profile, in particular its curvature, can be changed. This is the manner in which the glider-canopy is controlled.

It is important that the glider-canopy retain its flight stability even in the event of adverse wind conditions. Heretofore this was possible only by using such sails which consisted of two superposed sail-cloth surfaces connected by vertical and connecting frame walls at regular spacings (U.S. Pat. No. 3,285,546). In this manner a number of adjoining, tubular chambers are formed between the two sail-cloth surfaces, where these chambers are open at the front and where the incident air builds up pressure. The dynamic pressure so generated inflates the sail and provides it with dimensional stability.

A variation of this glider-canopy is disclosed in the German Auslegeschrift No. 2,054,758. In the embodiment shown therein by FIGS. 1 through 4, the sail consists merely of one sail-cloth surface. A plurality of cross-sectionally triangular chambers extending in the direction of depth of the sail are mounted to its underside and are open at the front, creating a pressure head from the incident airflow. In this case too the dynamic pressure ensures the sail's dimensional stability. The shroud lines act on the undersides of the chambers. Reinforcing surfaces and bands issue from the points acted on by these lines.

Further glider-canopy are described in German Gebrauchsmustern No. 87 07 797.3 and 87 09 923.3. To achieve greater safety at high attack angles and also for flight in turbulence, the former Gebrauchsmuster provides that the lower sail-cloth surface extend only over part of the profile length, further that said slats extending in the direction of flight be inserted into the upper sail-cloth surface, and in that the profile nose be made aerodynamic using a plastic foil or foam panel.

A further development of this glider-wing is described in the latter Gebrauchsmuster. This glider-canopy is characterized by a flexible bar having curved edges and inserted into the profile nose, the curved edges being connected by a tensioning rope inserted into the afterleech rope of the upper sail-cloth surface. In both cases the shroud lines to which the personnel means are fastened act on fins made of sail cloth and extending from the sail downward. Part of the shroud lines also is connected with the front edge of sail. So-called brake-cords act on the rear edge of the sail.

Stabilizing glider-canopy sails by means of dynamic-pressure apertures entails the drawback that even the latest glider-canopy on the market at the present time will achieve merely top speeds of 45 km/h and a lift-drag ratio up to 5 at about 30 km/h. Test computations show that these poor values essentially are due to the chamber apertures because these by themselves account for more than 50% of the total drag. Accordingly the inherently good flight properties of the glider-canopies stabilized with dynamite pressure are traded off against relatively poor lift-drag ratios and speeds. However this poor lift-drag ratio offers the advantage that the glider-canopy is stable as regards swinging about its horizontal transverse axis, the glider-canopy drag being larger than that of the pilot.

Improved lift-drag ratios can be achieved provided the sail consist of only one cloth-surface as disclosed in the German Gebrauchsmuster No. 87 09 923.3, FIG. 4, because such glider-canopies evince only a significantly low drag. Computation shows however that when reaching a lift-drag ratio of 6, the sail drag is about the same as that of the pilot. Great instability about the horizontal transverse axis ensues, and therefore, for instance in the event of loss of lift due to an air pocket, the sail shoots forward. These are life-endangering flight conditions. Moreover such glider-canopies are difficult to launch. If the wind is strong, launch is impossible.

Therefore it is the object of the invention to so design a glider-canopy that it will evince high flight stability in spite of improved lift-drag ratios.

This problem is solved by the invention in that the fins are provided with reinforcements whereby these fins at least when tensioned by the shroud lines during flight will be tensioned in the horizontal direction. Accordingly the basic concept of the invention is to tension the fins by means of their reinforcements in the direction of depth of the sail, and it suffices for the effect thereby determined that this tensioning action take place only under flight stress, that is, when the tensions of the shroud lines are acting on the sail and/or the fins. The fins so stabilized on one hand prevent the sail from collapsing in the horizontal direction, i.e. the depth direction. On the other hand, unlike the previous designs, the fins cannot deviate to the side. The excess pressure acting on the fins entails that the sail is tensioned transversely, i.e. in the wing-span direction without the need of further, special steps such as mounting a spar extending from one end to the other in the leading edge of the sail or airflow-inhibiting dynamic-pressure chambers in the sail. By means of the fins so reinforced, the sail is dimensionally stabilized longitudinally and transversely. This is a substantial advance toward achieving flight stability also for those glider-canopies equipped with a sail of a single cloth-surface and having high lift-drag ratios.

Furthermore it was found advantageous for flight stability that at least the outer fins be slightly converging towards the rear edge.

Illustratively the fin reinforcements may be areal. The fins may comprise rigid boards or consist of them, however with the drawback of being bulky and heavy when being transported. To avoid such drawbacks, it is more appropriate to make the fins out of a flexible and slack material such as sail cloth, better yet spinnaker cloth and to insert reinforcing braces into the fins which thereby shall be kept tensioned at least under flight load when the tensions transmitted by the shroud lines act on the fins.

In especially advantageous manner, the reinforcing braces may be made elastically bending and will be so mounted in the strips that the sail in the unstressed state shall be bulging upward at least at its rear, whereas under flight load, the reinforcing braces shall be elastically bent downward at the rear so as to form a wing section. In this design, the reinforcing braces when in the flight condition—that is, when acted on by the downward-directed tractions of the shroud lines with appropriate selection of their lengths—shall be bent in such a manner that a slightly convex wing section forms. In the event of load decrease, for instance an air pocket, the lifts and tractions acting on the shroud lines will vary in such a way that the sail drop-ins and the reinforcing braces are stress-relieved, whereby the sail can assume an upwardly convex shape at least at the rear. A substantial increase in drag and hence reduction of the lift-drag ratio ensues, preventing a forward shift by the sail and thereby unstable flight. Again the glider canopy enjoys stability against swinging, the drag of the sail being substantially larger than that of the pilot. Therefore this step achieves high stability relative to pitching about the horizontal axis without thereby having to accept a low lift-drag ratio under normal flying conditions. For the first time it is now possible to make a glider-canopy flight-stable while enjoying a high lift-drag ratio.

It is recommended that shroud lines act on the rear of the sail and/or the fins so that the reinforcing braces be slightly bent downward under normal flight load to form a wing section. Appropriately shroud lines shall act on the leading and/or trailing edge of the sail always in the planar area of the fins so that they shall be especially effective with respect to the reinforcing braces.

The above-described basic concept of the invention may be implemented in many embodiments. One possibility is in the fins comprising a continuous and bent lower edge into which are inserted reinforcing braces bent to match. Under tension, the front and rear ends will be somewhat bent downward, and thereby an approximately wing-section will be created. Upon load-relief, the reinforcing braces elastically move up, whereby a high-drag section is created and the glider canopy acquires stability relative to swinging. In order to enhance the elastic-return effect upon load-relief, additional tension-springs may be mounted in the fins where these springs are connected to at least the rear ends, but also to the front and rear end zones of the reinforcing braces.

Another alternative consists in the fins being triangular with the apices pointing down and in the free triangle-sides always being provided with reinforcing braces appropriately linked together in the area of the free said apices of the fins. Under flight load the reinforcing braces bend concavely downward, whereby the sail assumes the shape of a wing-section. Upon load-relief, the reinforcing braces will stretch, whereby the sail undergoes a depth-directed S-impact with raised trailing edge. The increase in drag so produced decelerates the sail, preventing forward tipping-over. Then the glider canopy has acquired swinging stability.

Another embodiment is characterized in that the fins are trapezoidal and in that at least their free rear edges are provided with reinforcing braces. Appropriately both the rear and the front edges shall be equipped with reinforcing braces, it being advantageous furthermore to link the lower ends of the reinforcing braces by at least one more reinforcing brace. This link may be such that the connecting braces are rendered arcuate upward into the fin by spring stress or that two connecting braces are provided in each fin and their connected ends meet a distance away from the lower edge of the particular fin. The effect is the same as for the triangular fins, that is, the reinforcing braces under flight-load become slightly concave, producing a wing section, while upon load-relief of the shroud lines they stretch upward and thereby generate a sail section of high drag.

A similar effect can be achieved by arranging sail-slats extending in the direction of flight into the sail, where these slats are elastic and are easily bent upward in the load-relief state, whereas under flight load, they will be elastically bent downward from said up-position and while forming thereby a wing section. The sail so equipped with slats also changes its geometry in relation to flight conditions, for instance in normal flight the sail slats are easily bent downward by the tensions transmitted from the shroud lines, whereby the sail is endowed with a wing section. Upon load relief, for instance in the presence of an air pocket, the rear ends of the sail slats again bend upward, whereby the sail receives an S-impact in the direction of depth and thus the drag will increase markedly. Thereupon the glider canopy again is endowed with stability relative to swinging. The upward-bending of the sail-slat ends may be reinforced by tension springs or it may be even produced first by them, where these tension springs are stressed between the rear ends and a point of the sail slats that is farther ahead. The sail slats may be connected in split, that is in articulating manner, to each other between the hook-up points of the tension springs.

Appropriately the sail slats extend over the entire sail depth. The design of the invention for the fins can be combined with the above design of the slats to support the change in sail geometry between normal and critical flight conditions. In that case the sail slats should be mounted above the fins.

The sail section, especially where the sail consists only of one cloth surface, can be further stabilized by inserting individual, flexible reinforcing spars between the fins, or the slats, into the leading edge of the sail. These reinforcing spars should bend elastically. Illustratively already hose segments are suitable, and being characterized by high flexibility, the sail can be collapsed without having to remove the hoses. Preferably the leading edge of the sail between the fins, or the reinforcing spars, shall be slightly arcuate and the reinforcing spars pre-stressed. The reinforcing bars should be connected together in articulating manner.

The invention is schematically shown in closer detail in the drawing by means of illustrative embodiments.

FIG. 2 is a view of another embodiment mode of a glider canopy seen obliquely from the front, FIG. 8 is a cross-section of a glider canopy without fins but with sail slats.

Figure 1:
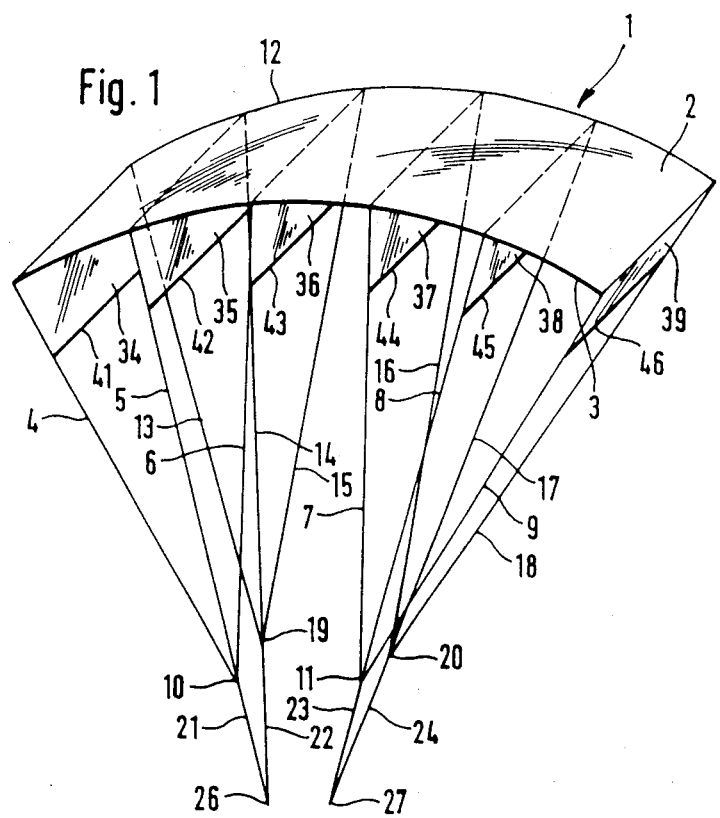
FIG. 1 is a view of a glider canopy seen obliquely from the front.

The glider-canopy 1 shown in FIG. 1 comprises a somewhat rectangular sail 2 consisting of a single cloth surface of spinnaker material. A total of six shroud lines 4, 5, 6, 7, 8, 9 essentially equidistant act on the leading edge 3 of the sail 2, a set of three shroud lines always converging to a point 10, 11. Again six shroud lines 13, 14, 15, 16, 17, 18 are fastened to the trailing edge 12 of the sail 2, of which two sets of three lines converge to a point 19, 20. From these points 10, 11, 19, 20, the shroud lines continue as shroud cables 21, 22, 23, 24 of which sets of two, namely 21, 22 and 23, 24, of one side, combine at the points 26, 27. A personnel support may be latched into these points 26, 27.

Equidistant trapezoidal fins 34, 35, 36, 37, 38, 39 made of spinnaker cloth are sewed into the underside of the sail 2. These fins always extend between two shroud lines 4, 13 or 5, 14 or 6. 15 or 7, 16 or 8. 17 or 9, 18 arranged in the direction of flight, that is perpendicularly to the leading and trailing edges 3 and 12 of the said 2. The fins front and rear edges are attached to the pertinent shroud lines (4, 5, 6, 7, 8 ,9, 13, 14, 15, 16, 17, 18).

Reinforcing braces 41, 42, 43, 44, 45, 46 are mounted in the lower edges of the fins 34, 35, 36, 37, 38, 39. These reinforcing braces 41, 42, 43, 44, 45, 46 stabilize the fins 34, 35, 36, 37, 38, 39 in such a manner that they form practically rigid surfaces under flight conditions, i.e., they will not bend to the outside. Excess pressure forming in flight between the fins 34, 35, 36, 37, 38, 39, the sail 2 is kept open in the direction of its span, that is, perpendicularly to the direction of flight, without the need for special bracing in this sail 2 itself. When being launched, the initially collapsed glider canopy 2 very rapidly opens by itself on account of the aerodynamic forces. Because there are no further bracing means, the glider-canopy 1 can be packed quite compactly.

The glider-canopy 47 shown in FIG. 2 also comprises a rectangular sail 48. Triangular fins 49, 50, 51, 52, 53, 54 made of spinnaker cloth are mounted to its underside and in equidistant manner, extending in the direction of flight, that is at right angles to the leading and trailing edges 55, 56 or the sail 48. The upper edges of these fins extend across the entire depth of the sail 48. Only the two outer fins 49, 56 slightly converge toward the trailing edge 56 of the sail 48 because the span of this sail 48 is somewhat wider at the leading edge 55 than at the trailing edge 56.

Shroud lines illustratively denoted by 57 are fastened to all three corners of the fins 49, 50, 51, 52, 53, 54. Therefore there are always three shroud lines 57 sequentially arrayed in the direction of flight. The shroud lines 57 of one side combine at points 58 or 59.

The leading edge 55 of the sail 58 is reinforced by means of inserted segments of rubber hoses 60 which are 15 mm in diameter and always extending between two fins 49, 50, 51, 52, 53, 54. As a result, when the sail 48 tends to collapse from the side, funnel-shaped openings will form wherein enough dynamic pressure can build up to reopen the sail 48.

The upper edges of the fins 49, 50, 51, 52, 53, 54 joined to the sail 48 are slightly convex to impart a wing-section height of about 1% to the sail 48. The front and rear edges of the fins (49, 50, 51, 52, 53) are made slightly concave. Reinforcing braces in the form of thin, elastic and straight fiber-glass tubes illustratively denoted by 61 and shown in dashed lines are sewed into those edges.

Figure 3:
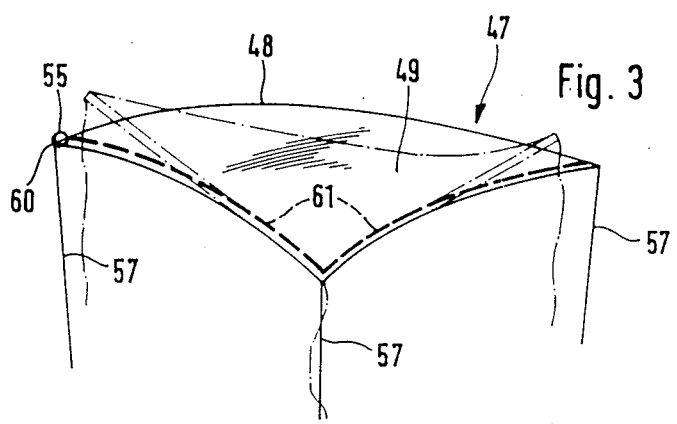
FIG. 3 is a cross-section of the glider canopy of FIG. 2, FIGS. 4 through 7 are cross-sections of further glider canopies having different fins.

FIG. 3 shows in further detail by means of the fin 49 how the fins 49, 50, 51, 52, 53, 54 behave under different flight conditions. Normal flight is shown by the solid lines. The figure shows that the reinforcing braces 61 are bent into a slightly concave shape, i.e. downward. This is achieved by the shroud lines 57 acting on the leading and trailing edges of the sail 48 which are kept so short relative to the shroud lines 57 acting on the middle apices of the fins 49, 50, 51, 52, 53, 54 that the largest part of the tractions is transmitted through the shroud lines 57 acting on the leading and trailing edges of the sail 48. Thereby the free ends of the reinforcing braces 61 are curved downward. As a result, the sail 48 is horizontally tensioned between the free ends of the reinforcing braces 61 and thus is imparted its convex shape by the lift acting on the sail 48. In the event of an air pocket, the sail 48 collapses from above. Simultaneously the shroud lines 57 are stress-relieved. The ends of the reinforcing braces no longer apply downward tractions, and consequently they will elastically straighten out. Thereupon they assume the position shown in dashed lines. The sail then collapses and is upwardly bulging at the rear. This entails a substantial increase in drag, whereby the sail 48 automatically catches itself, i.e. it does not shoot forward. Thereupon the glider-canopy automatically stabilizes itself against swinging. As the air pocket weakens, the tension in the shroud lines 57 increase again in such a way that the sail 48 resumes its normal wing section.

Figure 4:
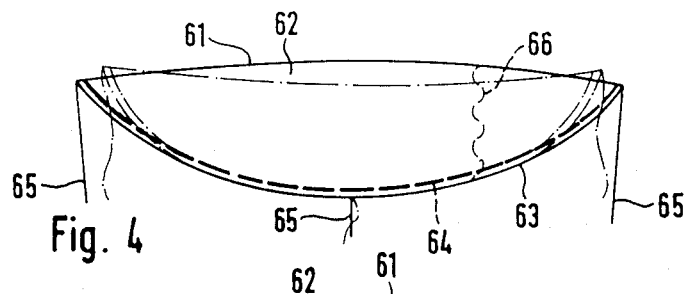

The above-described flight stability—especially for critical flight conditions—also may be achieved with fins of different shapes. In the embodiment mode shown in FIG. 4, fins 62 are sewed to the underside of the sail 61 that have an oval lower edge 63. A suitably bent reinforcing brace 64 is inserted into each lower edge 63, this brace being elastic and illustratively consisting of a fishing rod segment. Shroud lines illustratively denoted 65 act on the leading and trailing edges of the sail 61 and also on the middle of the fins 62.

Normal flight is indicated by solid lines. Because of lift, the sail 61 slightly bulges upward. The ends of the reinforcing braces 64 are pulled somewhat elastically downward by the tractions transmitted by the shroud lines 65 to the trailing and leading edges of the sail 61, where said tractions in view of the designed lengths are somewhat larger than those exerted by the middle shroud lines 65. The tractions decrease in the event of an air pocket, and hence the ends of the reinforcing braces 64 will bend upward. The sail 61 collapses and bulges upward at the rear, resulting in increased drag (dashed lines). This shaping of the sail 61 may be enhanced furthermore by an additional rubber cable 66 sewed into the fin 62.

Figure 5:
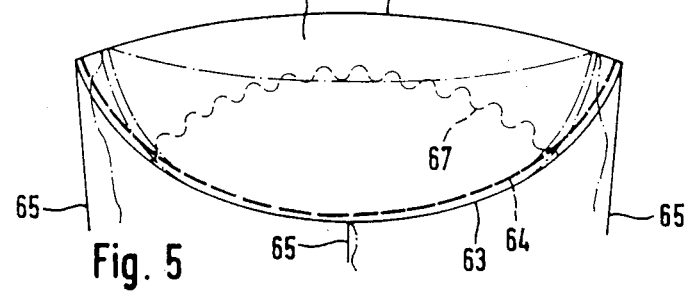

FIG. 5 shows a similar embodiment mode. It differs from that of FIG. 4 only by the absence of a vertical rubber cable 66, rather there being a tensioned rubber cable 67 between the front and rear zones of the reinforcing brace 62. In the event of an air pocket this rubber cable 67 supports the upward bending of the end zones of the reinforcing brace 64. The shape which then occurs is shown in dashed lines.

Figure 6:
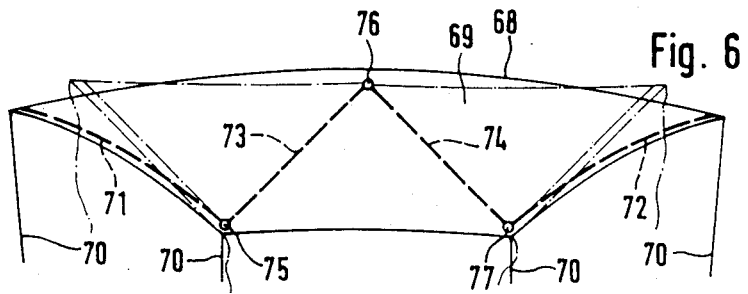
Figure 7:
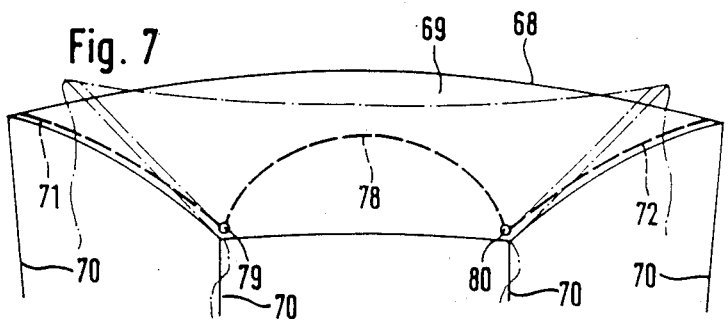

FIGS. 6 and 7 show embodiment modes wherein the sail 68 comprises trapezoidal fins. Shroud lines 70 act on the particular fin 69 shown, namely at the leading and trailing edges of the sail 68 and at the corners of the fins 69. Reinforcing braces 71, 72 are sewed into the front and rear edges of the fins 69. The particular mutually facing ends of those braces are linked by two connecting braces 73, 74 in the embodiment mode of FIG. 6, and this by articulation means 75, 76, 77. Together with the lower edge of the fin 69 the connecting braces 73, 74 form a triangle. In the embodiment mode of FIG. 7, the mutually facing ends of the reinforcing braces 71, 72 are linked by an arcuate connecting brace 78, the linkage being through articulation means 79, 80.

The change in shape of the sail 68 for different flight conditions is somewhat comparable with that of the embodiment mode shown in FIG. 3. In normal flight (solid lines), the reinforcing braces 71, 72 are easily bent downward by the tractions transmitted from the shroud lines 70 to the leading and trailing edges of the sail 68 because these shroud lines are appropriately shorter and therefore exert a higher traction than the middle shroud lines 70. Thereby the sail 68 is tensioned. In the event of an air pocket the tensions in the shroud lines 70 decrease, whereby the reinforcing braces 71, 72 elastically return upward, i.e. they straighten out. The sail 68 collapses and bulges upward at the rear, whereby its drag increases markedly (dashed lines). The drag having increased drastically, stability against swinging is achieved.

In the embodiment mode of FIG. 8, equidistant sail slats 82 are inserted into a sail 81 and extend over the entire depth of this sail 81, and consist of an elastic material. Shroud lines illustratively denoted 83 act on the sail slats 82 and both on the leading and trailing edges of the sail 81 and approximately at the center of the sail slat 82. The shape of the sail slat 82 is such that in the untensioned state (shown in dashed lines) it is bent upward. A tension spring 84 may enhance this effect, being mounted at one end in the front zone of the sail slat 82 and at the other end at the slat's rear edge. The tension spring 84 illustratively may be a rubber cable.

In normal flight (solid lines), the tractions exerted by the shroud lines 83 pull the sail slat in the rear area downward, whereby a slightly upward bulging wing-section results. If on account of an air pocket acting from above on the sail 81 the traction forces decrease, the sail slat 82 will bend upward at its rear, whereby the sail undergoes an S-shaped impact (dashed lines). Thereby the drag increases strongly, and the glider-canopy is stabilized against swinging.

Obviously the embodiment mode of FIG. 8 can be combined with fins such as shown in FIGS. 3 through 7, whereby the effect from the change in shape of the sail slats 82 will be reinforced and in particular the stability in the span direction is substantially improved.

I claim:

1. A glider-canopy with a wing-shaped sail having a rear edge to the underside of which are mounted downward fins essentially parallel to the intended direction of flight, shroud lines acting at least on the fins and converging by their free ends into a personnel-support, characterized in that the fins (34 through 39, 49 through 54, 54, 62, 69) are equipped with elastically bendable reinforcements (41 through 46, 61, 64, 71, 72) tensioning the fins (34 through 39, 49 through 54, 62, 69) at least under traction from the shroud lines (4 through 18, 57, 65, 70, 83) during flight and essentially in the horizontal direction so that in the loaded state the sail bulges downwardly at least at said rear edge and in the event of a load decrease said reinforcements are stress relieved and the sail bulges upwardly at least at said rear edge.

2. Glider-canopy defined in claim 1, characterized in that the fins include areal reinforcements or consist of them.

3. Glider-canopy defined in claim 1, characterized in that the fins (34 through 39, 49 through 54, 62, 69) consist of an elastic and slack material and in that reinforcing braces (41 through 46, 61, 64, 71, 72) are inserted into them.

4. Glider-canopy defined in claim 3, characterized in that shroud lines (4 through 18, 57, 65, 70, 83) act on the zone of the trailing edge (12, 56) of the sail (2, 48, 61, 68, 81) and/or of the rear edges of the fins (34 through 39).

5. Glider-canopy defined in claim 3 characterized in that the shroud lines (4 through 18, 57, 65, 70, 83) act on the leading and/or trailing edge of the said (2, 48, 61, 68, 81) each time in the plane of the fins (34 through 39, 49 through 54, 62, 69).

6. Glider-canopy defined in claim 3, characterized in that the reinforcements are mounted in the fins (49 through 54, 62, 69).

7. Glider-canopy defined in claim 6, characterized in that the fins (62) comprise curved lower edge (63) into which are inserted correspondingly curved reinforcing braces (64).

8. Glider-canopy defined in claim 6, characterized in that the fins (49 through 54) are triangular with their apices downward and in that the free triangle sides have each a reinforcing brace (61).

9. Glider-canopy defined in claim 6, characterized in that the fins (69) are trapezoidal in that at least the free rear edges of the fins comprise reinforcing braces (71, 72).

10. Glider-canopy defined in claim 9, characterized in that the lower ends of the reinforcing braces (71, 72) are linked together by at least one further connecting brace (78).

11. Glider-canopy defined in particular by claim 1, characterized in that the reinforcements comprise sail slats (82) extending in one direction of flight.

12. Glider-canopy defined in claim 11, characterized in that tension springs (84) to bend upward the rear ends of the sail slats 82 are mounted to these ends.

13. Glider-canopy defined in claim 1 characterized in that individual and flexible reinforcing spars 60 are integrated between the fins 52 or the sail slats 82 into the leading edge of the sail.

14. A glider canopy, comprising:
   (a) a wing-shaped sail having a front edge and a rear edge;
   (b) a plurality of laterally spaced fins secured to said sail and extending downwardly therefrom, each fin spanning said sail between said edges;
   (c) a plurality of elastically bendable reinforcement means, each reinforcement means secured to an associated fin and extending between said edges so that in the loaded state said sail bulges downwardly at least at said rear edge and in the event of a load decrease said reinforcement means are stress relieved and said sail bulges upwardly at least at said rear edge; and,
   (d) a plurality of associated first and second shroud lines operably connected with said fins for applying a horizontal tension to the associated fins and thereby said sail during flight so that the fins are maintained stabilized between said edges and relative to each other, each of said first shroud lines is connected to an associated elastically bendable reinforcement means at said front edge and each of said second shroud lines is connected to an associated elastically bendable reinforcement means at said rear edge.

15. The canopy of claim 14, wherein:
   (a) each of said reinforcement means is disposed within the associated fin.

16. The canopy of claim 15, wherein:
   (a) said reinforcement means are comprised of an elastically flexural material.

17. The canopy of claim 14, wherein:
   (a) each of said fins has an arcuate lower edge; and,
   (b) each of said reinforcement means is arcuate and is disposed within the associated lower edge.

18. The canopy of claim 14, wherein:

(a) each of said fins is triangular in elevation and has its apex spaced from said sail; and,
(b) said reinforcement means extend from said apex along the associated sides.

19. The canopy of claim 14, wherein:
(a) each of said fins is trapezoidal in elevation and has a pair of free edges and each free edge is associated with one of said front and rear edges; and,
(b) said rear free edges comprise reinforcing braces.

20. The canopy of claim 14, wherein:
(a) said elastically bendable reinforcement means comprise sail slates extending between said front and rear edges, said slats comprised of an elastically flexural material and being upwardly bent at the rear when unstressed and being downwardly bent when stressed during flight.

21. The canopy of claim 20, wherein:
(a) a tension spring is operably associated with each of said slats for applying an upward bias thereto.

22. The canopy of claim 14, wherein:
(a) a plurality of flexible reinforcing spars extend along said front edge.

23. A glider-canopy with a wing-shaped sail to the underside of which are mounted downward fins essentially parallel to the intended direction of flight, shroud lines acting at least on the fins and converging by their free ends into a personnel support, characterized in that the fins are equipped with reinforcements tensioning the fins at least under traction from the shroud lines during flight and essentially in the horizontal direction, the sail comprises sail slats extending in the direction of flight and of elastically flexural nature which in the unstressed state are slightly bent upward at the rear but which for flight load are elastically bent downward from the said upward position while forming a wing section.

24. The glider-canopy of claim 23, characterized in that tension springs to bend upward the rear ends of the sail slats are mounted to these ends.

* * * * *